United States Patent
Lombardo et al.

(10) Patent No.: US 6,351,088 B1
(45) Date of Patent: Feb. 26, 2002

(54) NON-REVERSING WIPER PARK SWITCH FOR WIPER DRIVE APPARATUS

(75) Inventors: Frank Lombardo; Harry Owlett, both of Rochester, NY (US); Christopher Jones; Harald Klode, both of Dayton, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/522,095

(22) Filed: Mar. 9, 2000

(51) Int. Cl.[7] .................................................. H02P 7/10
(52) U.S. Cl. .................. 318/DIG. 2; 318/15; 200/279; 15/250.1; 15/250.12; 15/250.16; 15/250.17
(58) Field of Search ............................ 318/15, DIG. 2, 318/282; 15/250.1, 250.12, 250.16, 250.17; 200/279

(56) References Cited

U.S. PATENT DOCUMENTS

| | | | |
|---|---|---|---|
| 3,593,090 A | * 7/1971 | Kearns | 318/444 |
| 3,703,017 A | * 11/1972 | Edwards et al. | 15/250.02 |
| 4,259,624 A | 3/1981 | Seibicke | 318/282 |
| 4,355,270 A | 10/1982 | Cook et al. | 318/443 |
| 4,455,511 A | * 6/1984 | Stewart, Sr. | 318/9 |
| 4,547,716 A | 10/1985 | Johnson | 318/443 |
| 4,609,794 A | 9/1986 | Porter | 200/24 |
| 4,670,695 A | * 6/1987 | Licata et al. | 318/443 |
| 4,700,026 A | 10/1987 | Kamiyama et al. | 200/19 R |
| 4,857,812 A | * 8/1989 | Mochizuki et al. | 318/15 |
| 4,904,908 A | * 2/1990 | Buschur | 318/282 |
| 5,068,500 A | 11/1991 | Kitada | 200/19 R |
| 5,147,989 A | * 9/1992 | Ito | 200/11 R |
| 5,422,449 A | 6/1995 | Kano et al. | 200/19 R |
| 5,844,382 A | * 12/1998 | Dan | 318/10 |
| 5,998,949 A | 12/1999 | Amagasa | |

FOREIGN PATENT DOCUMENTS

| | | |
|---|---|---|
| DE | 196 09 973 A1 | 3/1996 |
| EP | 0 398 630 | 11/1990 |
| EP | 0 888 942 A2 | 1/1999 |
| GB | 2 101 405 | 1/1983 |

\* cited by examiner

*Primary Examiner*—Robert E. Nappi
*Assistant Examiner*—Rita Leykin
(74) *Attorney, Agent, or Firm*—J. Gordon Lewis

(57) ABSTRACT

A wiper drive apparatus includes a drive gear rotated by a motor, a lead frame carried on a cover attachable to the motor or motor gear and including a circumferentially of discrete conductive traces, and a park switch bridge rotatably mounted on the cover and carrying a circumferentially of spaced contacts, each slidable over conductive traces to open and close a circuit to the drive motor as the park switch bridge is engaged by and rotated by the drive gear. Each contact is carried on a beam projecting from a circumferentially of radially extending arms forming the park switch bridge. A drive pin carried on the drive gear engages successive arms to rotate the park switch bridge 90° for each revolution of the drive gear to bring a different contact into electrical connection with the conductive traces without requiring additional tooling for the lead frame or the park switch bridge itself.

35 Claims, 4 Drawing Sheets

NON-REVERSING WIPER PARK SWITCH FOR WIPER DRIVE APPARATUS

BACKGROUND OF THE INVENTION

1. Field of the Invention

Present invention relates, in general, to vehicle windshield wipers, and, more particularly, to windshield wiper park switches.

2. Description of Related Art

In vehicle windshield wiper drive apparatus, the wipers are provided with an automatic home or park position stop device which enables a wiper blade to return to the home position regardless of when a user turns off a wiper switch during the wiping cycle.

In a typical wiper park switch, an electrically conductive plate is provided with electrically conductive and electrically non-conductive portions or traces. An electrical contact (s) fixed to or otherwise driven by a drive gear coupled to the wiper drive motor cooperates with the electrically conductive plate to form a switch when opens and closes an electric circuit of the wiper drive motor so that even when the user turns off the wiper switch of the vehicle during the wiper cycle, the electrically conductive plate and the contact(s) form an electric circuit which enables the wiper blade to return to the park position. The contacts are typically driven or moved by the gear between two positions, one forming a closed switch with the electrically conductive plate and the other forming an open circuit. When opening the electric circuit to the motor, the contact(s) shorts the circuit to form a dynamic brake which quickly stops the wiper arm at the park position.

However, prior vehicle windshield wiper drive mechanisms of this type experience several problems. First, the single park switch contact is moved into and out of contact with the conductive traces on the conductive plate many times during a wiping operation. This causes wear of the contact and requires a more robust wiper and contact design which adds to the cost of manufacturing the vehicle wiper.

Second, prior wiper driving apparatus with conventional park switches frequently experience chatter when snow or another obstruction is disposed over a lower portion of the vehicle windshield preventing the wiper blade from returning to the park position. In this situation, the drive gear of the wiper motor is subjected to a force which acts in a direction counter to the normal rotation direction of the drive gear. When the wiper arm contacts the snow or obstacles, forces build in the arm which reverse rotates the drive gear. Since the park switch is connected directly to the drive gear rotated by the drive motor, the park switch also reverses direction again completing a circuit to the motor. This results in so-called "chatter" wherein the wiper drive motor is sequentially energized and de-energized at a rapid rate leading to a quick rise in the motor operating temperature and/or rapid deterioration of the park switch contact.

Thus, it would be desirable to provide a park switch for a vehicle wiper apparatus which overcomes the above-mentioned problems encountered with previously devised wiper park switches. It would also be desirable to provide a park switch for a vehicle wiper drive apparatus which can be constructed with a minimal number of components. It would also be desirable to provide a park switch for a vehicle wiper drive apparatus which minimizes wear to the movable contacting portions of the park switch. It would also be desirable to provide a park switch for a vehicle wiper drive apparatus which prevents "chattering" even if the wiper arm strikes an accumulation of snow or other obstacles preventing the wiper arm from moving to the park position.

SUMMARY OF THE INVENTION

The present invention is a park switch bridge for use in a wiper driving system.

According to one aspect of the present invention, the wiper drive apparatus includes a drive motor and a drive gear disposed in a housing. A lead frame is fixed within the housing and includes a plurality of discrete, electrically conductive tracks. A park switch bridge is rotatably mounted in the housing and engagably coupled to the drive gear for rotation with rotation of the drive gear. The park switch bridge includes a plurality of spaced contacts, each contact slidable over the conductive tracks to open and close a circuit to the drive motor upon rotation of the park switch bridge.

A park switch bridge drive or engagement member is carried on the drive gear and engages the park switch bridge upon rotation of the drive gear. The engagement member and the park switch bridge are arranged in intersecting, rotatable paths of movement such that each revolution of the drive gear causes engagement of the drive member with the park switch bridge to rotate the park switch bridge through a predetermined arc.

In one aspect of the invention, the contacts extend radially from a center portion of the park switch bridge.

Preferably, four contacts are provided on the park switch bridge equidistantally spaced substantially 90° apart.

According to another aspect of the invention, each contact is resiliently carried on an arm having one end at the center portion of the park switch bridge and an opposed outer end. According to another aspect of the present invention, a beam is cantilevered from each arm and carries the contact. In one aspect, the contact is unitarily formed as an integral part of the beam from the beam material. In another aspect of the invention, the contact is in the form of a pad fixedly mounted on the beam. Each beam projects from the plane of each arm to resiliently bias the contacts into engagement with the conductive tracks on the lead frame.

Each arm has a planar portion extending from the center portion and a raised sidewall extending along at least a portion of the peripheral edge of the planar portion. The drive or engagement member carried on the drive gear rotatingly engages the raised sidewall on each arm to rotate the park switch bridge upon rotation of the drive gear.

The park switch bridge of the present invention provides several advantages over previously devised park switches used in wiper driving apparatus. The provision of a plurality of contacts, such as four circumferentially spaced contacts on the park switch bridge, reduces contact wear compared to the single contacts used in prior art park switches by distributing contact wear substantially evenly over four contacts.

Also, the park switch bridge of the present invention, is unidirectionally coupled to the drive pin on the drive gear for rotation in only one direction. Thus, back driving or reverse rotation of the drive gear as caused by the wiper arm contacting an accumulation of snow or other obstacles on the lower portion of the vehicle windshield preventing the wiper arm from fully reaching the park position, does not result in reverse rotation of the park switch bridge which has heretofore resulted in "chattering" or a rapid on and off application of electric power of the wiper motor leading to contact deterioration and/or motor overheating. This arrangement also prevents the park switch bridge from being stranded in an operation position due to reverse rotation.

The present park switch bridge, by distributing contact wear over a plurality of contacts, such as four contacts, enables the contacts to be inexpensively formed from the spring beam material itself without exceeding a beam thickness which would adversely affect the spring properties of the bridge, or risking contact wear that is greater than the base material thickness.

Finally, the park switch bridge of the present invention, the lead frame, the drive gear and the drive pin can be readily mirrored for opposite oriented motor designs.

BRIEF DESCRIPTION OF THE DRAWING

The various features, advantages and other uses of the present invention will become more apparent when referring to following detailed description and drawing in which.

DESCRIPTION OF THE PREFERRED EMBODIMENT

Figure 1:
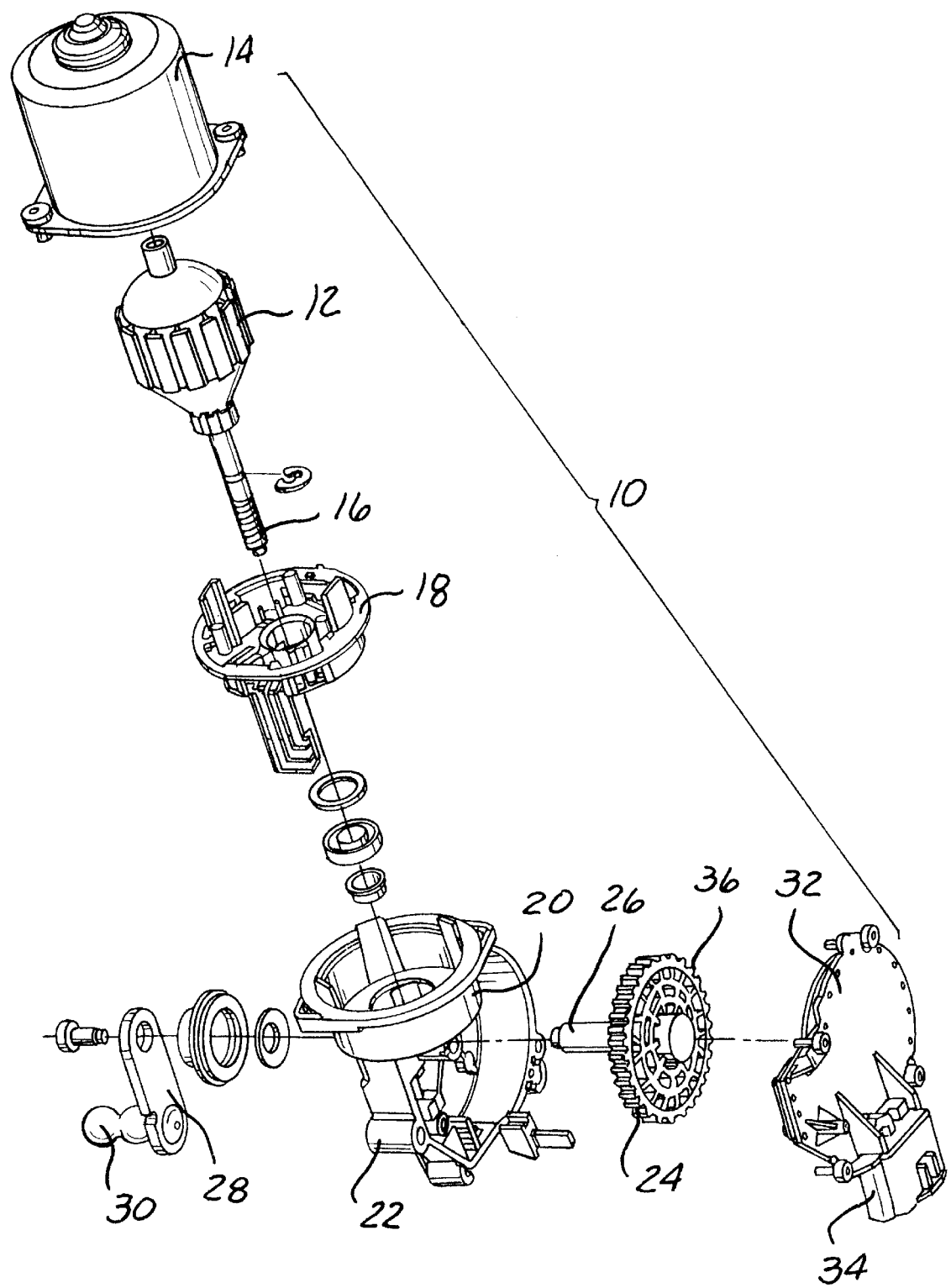
FIG. 1 is an exploded, perspective view of a wiper drive apparatus having a park switch constructed in accordance of the teachings of the present invention.

Referring now to the drawing, and to FIGS. 1–5 in particular, there is depicted a wiper drive apparatus 10 for driving a vehicle windshield wiper in a conventional manner. As the wiper motor and gear box of the wiper drive apparatus 10 are conventional and do not form part of the present invention, only a brief description will be provided for the wiper motor 10 and the gear box.

As shown in FIG. 1, the motor 12 is mounted in a housing 14 and has a rotatable output shaft formed with or carrying a worm gear 16 at an outer end. The worm gear 16 extends through a bore in a mounting plate 18 which is secured in a receptacle 20 in a gear box housing 22.

A drive gear 24 is coaxially mounted on one end of a rotatable drive shaft 26. The drive shaft 26 is supported within the gear box housing 22 and has an opposite end fixed to a bracket 28 carrying a wiper arm pivot 30. A wiper arm, not shown, is mounted on the pivot 30 in a conventional manner and driven in oscillation over a vehicle windshield in response to energization of the motor 12 and rotation of the drive gear 24 through meshing engagement of the drive gear 24 and the worm gear 16.

A cover 32 is mounted on the gear box housing 22 to enclose the drive gear 24 within the gear box housing 22. An output receptacle 34 is carried on or unitarily formed with the cover 32 for receiving an electrical conductor or cable and connector to transmit power and other signals through a conductive path formed or mounted within the gear box 22 and the mounting plate 18 to the motor 12.

As shown in FIG. 1, a park switch bridge drive or engagement member, such as a gear drive pin 36, for example, is fixedly mounted on the drive gear 24, preferably by molding as part of the drive gear 24. The gear drive pin 36 is spaced from a longitudinal axis extending through drive shaft 26 and is oriented generally parallel to the drive shaft 26 while extending toward the cover 32.

Figure 2:
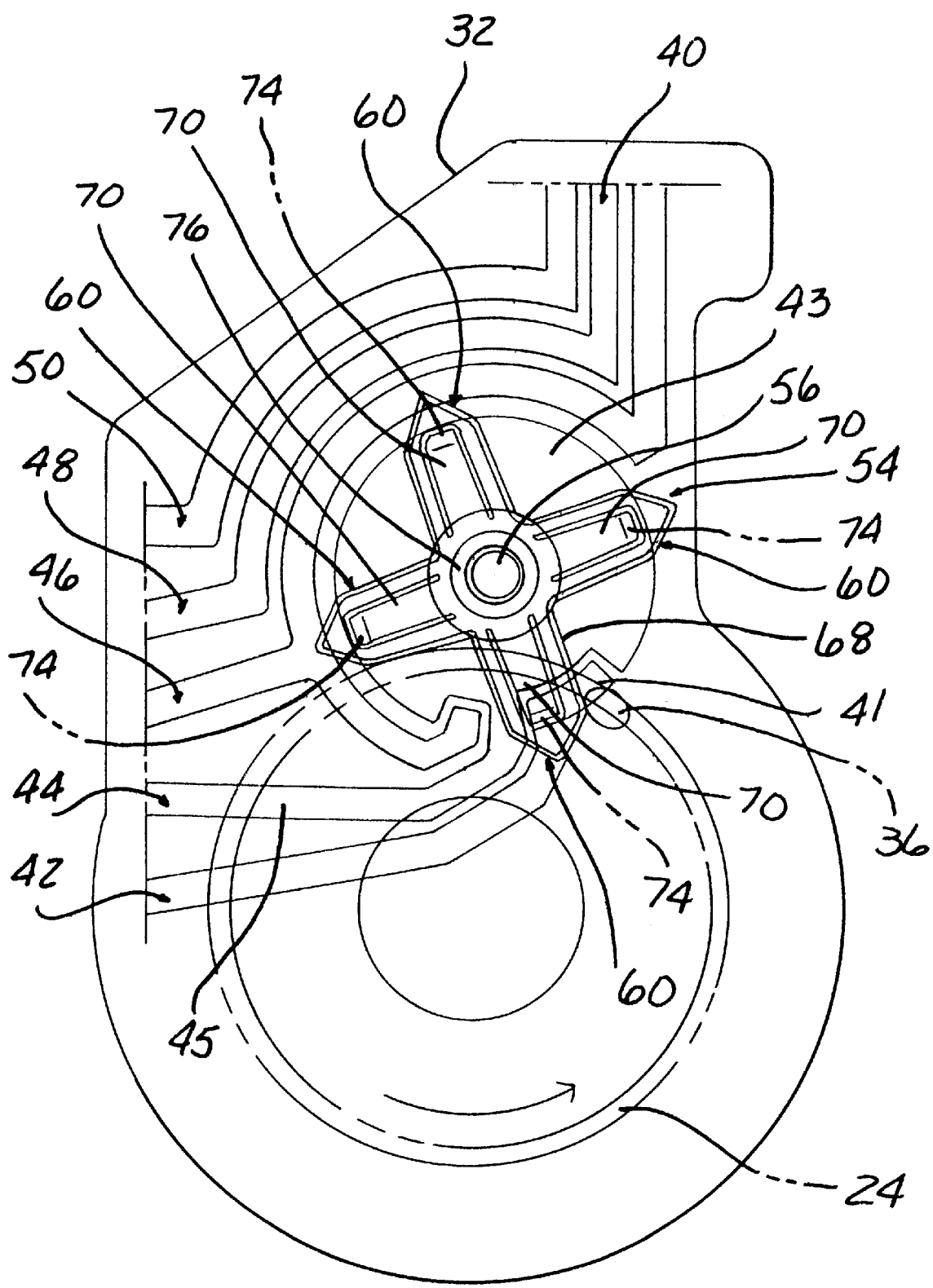
FIG. 2 is a bottom elevational view of the drive motor gear box cover, shown in FIG. 1 and depicting the park switch bridge and lead frame according to the present invention mounted on the cover and shown in a closed circuit power position.

In FIG. 2, the cover 32, the drive gear 24 and the gear drive pin 36 are depicted in phantom as they overlay the bottom surface of the cover 32 in the bottom view orientation shown in FIG. 2. A lead frame 40 is fixedly mounted on the cover 32 by means of fasteners, heat staking, insert molding, etc. Preferably, the lead frame 40 is insert molded in the cover 32.

As is conventional, the lead frame 40 is formed of a plurality of individual conductive traces or tracks, with five traces 42, 44, 46, 48 and 50 being depicted by example only. The conductive trace 42 labeled "B+" is connected to the vehicle battery. Conductive trace 44 is a park switch trace. Conductive trace 46 is connected to ground through a conductor or cable running through the receptacle 34 in the cover 32. Conductive traces 48 and 50 carry signals for low or high speed motor operation and again are connected through a connector mounted in the receptacle 34 in the cover 32 to an external control which is responsive to the user manipulatable wiper lever or switch mounted within the interior of the vehicle. As noted above, the conductive traces 42, 44, 46, 48 and 50 are connected through similar conductive traces in the gear box housing 22 and the mounting plate 18 to corresponding terminals or connections on the motor 12.

Generally, the conductor traces 42, 44, 46, 48 and 50 are over-molded with the cover 32 to allow smooth transition of the switch bridge contacts across the traces during rotation of the drive gear 24 as described hereafter.

Figure 5:
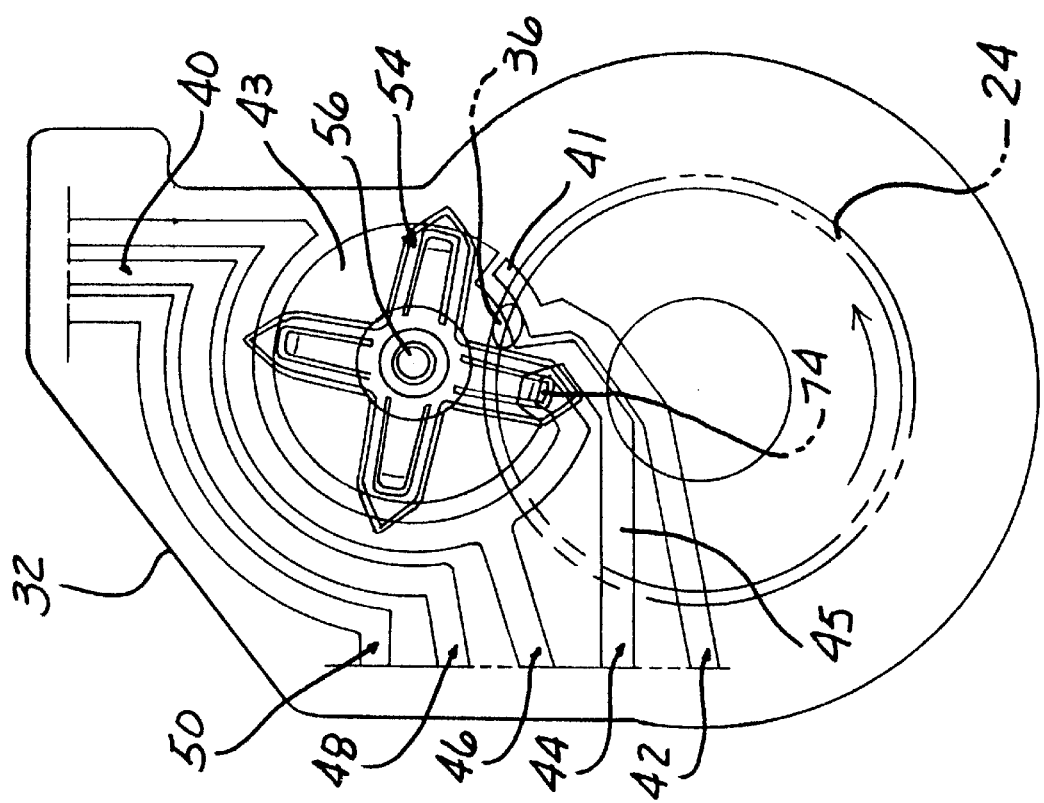
FIG. 5 is a bottom elevational view, similar to FIG. 2, but showing the park switch bridge in an open circuit position.

A park switch bridge 54 is rotatably mounted on a hub 56 unitarily projecting from the bottom surface of the cover 32. According to the present invention, the park switch conductive trace 44 is formed with a generally arcuate portion 43 having a circular shape which surrounds the hub 56. The park switch conductive trace 44 also includes an elongated, strip portion 45 which extends from a notched edge of the arcuate portion 43 to an edge of the cover 32 as shown in FIGS. 2 and 5. The conductive trace 42 labeled B+also has a strip portion extending adjacent to the strip portion 45 of the park switch trace 44. The conductor trace 42 terminates in an arcuate end portion 41 which is disposed within the notch formed in the peripheral edge of the arcuate portion 43 of the park switch conductive trace 44. Thus, it can be seen in FIGS. 2 and 5 that the end portion 41 of the B+ conductive trace 42 which is connected to the battery power is circumferentially adjacent a portion of the park switch conductive trace 44 at the same radius from the hub 56.

The conductive trace 46 which is adapted to be connected to ground in the present lead frame 40 has opposite end portions disposed adjacent to two edges of the cover 32 and a center arcuate portion which is concentric about a substantial portion of the diameter of the arcuate portion 43 of the conductive trace 44. Similarly, the conductor traces 48 and 50 have opposite end portions and a center arcuate portion which is regularly spaced from an adjacent portion of the ground conductor trace 46.

The park switch bridge 54 is, by example, formed as a one piece stamping of a suitable electrically conductive material, such as beryllium-copper alloy. The park switch bridge 54 has a starfish or cross configuration formed of a centrally located, frustoconical, hollow sleeve 58 which projects out of a solid central portion 62 of the park switch bridge 54.

A plurality of arms 60, co-planar with the solid central portion 62, extend radially outward therefrom. Preferably, the park switch bridge 54 includes four arms 60. The arms 40 are disposed at an angle to each other, with a 90° or perpendicular angle being illustrated by way of a preferred example. Each of the arms 60 extend from a common center portion 62 with the other arms, which center portion 62 surrounds a raised, annular lip 64 disposed concentrically above the sleeve 58.

Each arm 60 may have any shape, such as a rectangular shape extending from the common center portion 62 to an outer end 66. The side walls of each arm 60 are formed with a raised perimeter wall 68. The perimeter wall 68 projects outwardly from a generally planar portion of each arm 60 to increase the rigidity of each arm 60 and to provide a large contact area for engagement with the gear drive pin 36 as described hereafter. By way of example only, the outer end portion of each arm 60 tapers to a generally pointed outer end 66.

Figure 3:
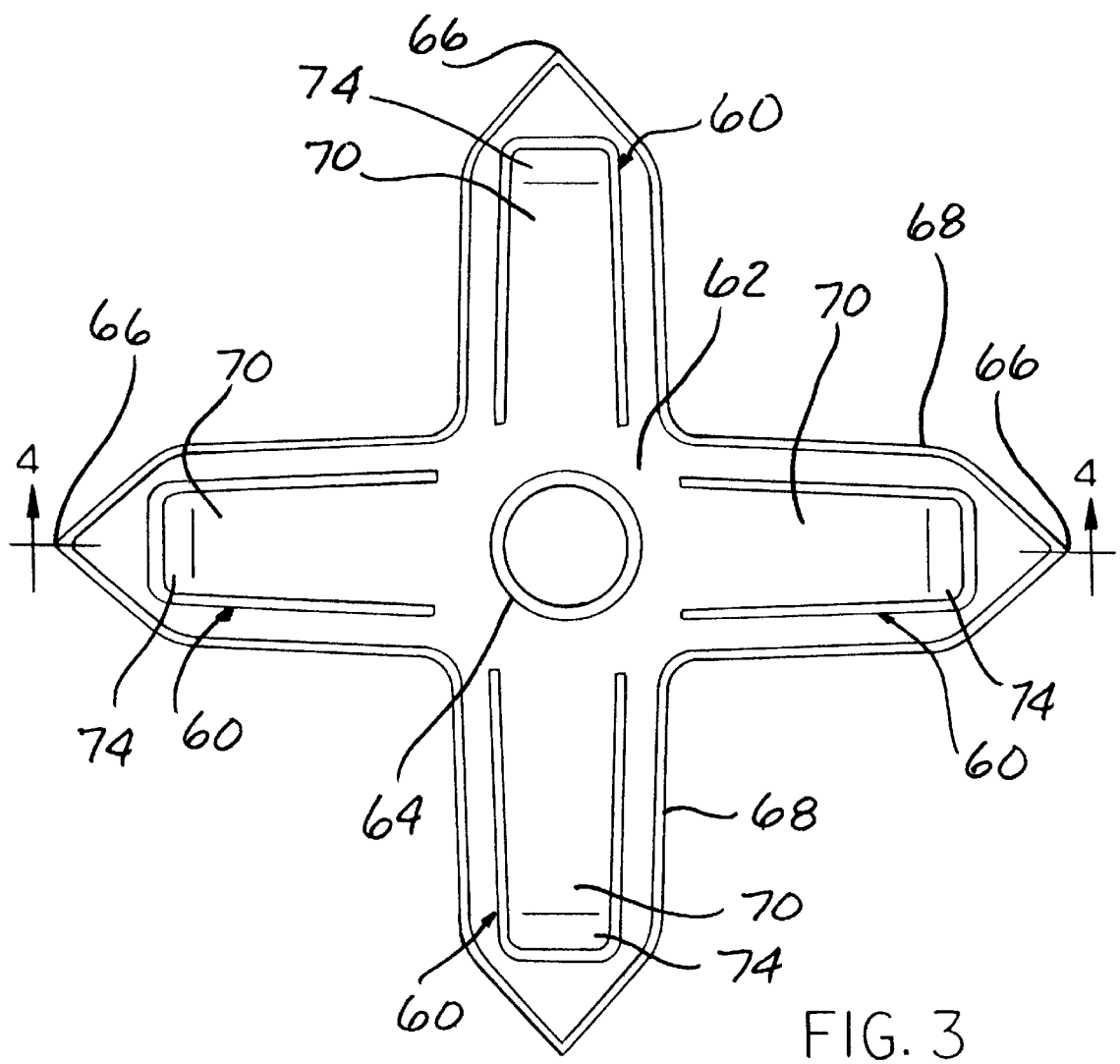
FIG. 3 is an enlarged, bottom elevational view of the park switch bridge shown in FIG. 2.

Each arm 60 carries an electrical contact 74 on a beam 70 extending angularly out of the plane of the arms 60. Each beam 70, as shown in FIG. 3, is located centrally within each arm 60 and extends from an interior end portion contiguous with the center portion 62 of the park switch bridge 54 in a cantilevered manner to the same side of the plane of the arm 60 as the sleeve 58.

Figure 4:
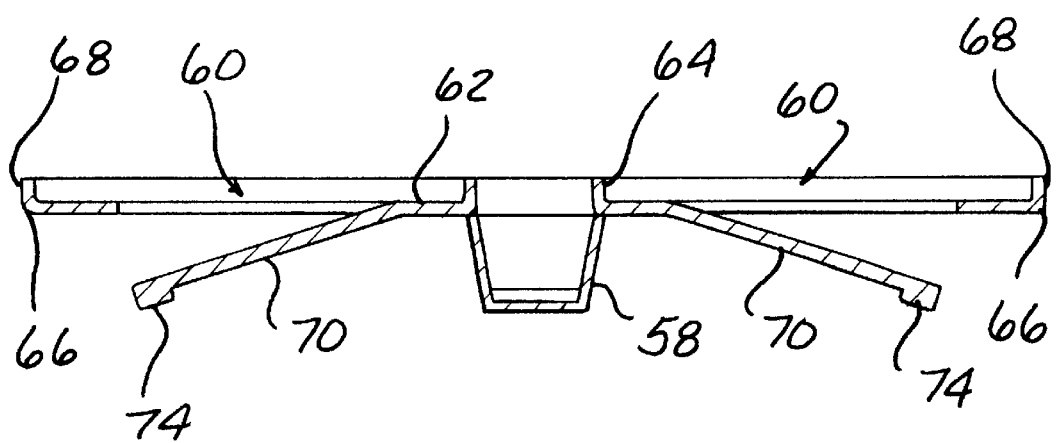
FIG. 4 is a cross-sectional view generally taken along line 4—4 in FIG. 3.

Generally, one beam 70 is initially integrally formed with one arm 60 and then punched, pierced, stamped or otherwise separated along three edges from the corresponding arm 60 and then bent angularly out of the plane of the arm 60 to a predetermined angle, as shown in FIG. 4, sufficient to engage the conductive traces on the cover 32. Each beam 70 is flexible to allow for unrestricted movement of the beam 70 relative to the associated arm 60 during assembly and subsequent motor operation.

A contact 74 is carried on the free or outer end of each beam 70. In one preferred aspect of the invention, each contact 74 is unitarily formed with each beam 70 and, preferably, is formed out of the beam material itself. Alternately, a separate contact pad is secured to the outer end of each beam 70 by means of a suitable fastener, such as a rivet.

Assembly of the park switch bridge 54 is as follows. The sleeve 58 of the park switch bridge 54 is slid over the hub 56 on the cover 32. A self-locking retainer clip 76, shown in FIG. 2, is then pushed over the sleeve 58 to a predetermined depth. This compresses the four beams 70 of the park switch bridge 54 and provides the necessary contact force to the beams 70 while allowing the beams 70 to have sufficient robustness to adapt to profile variations in the cover 32 and the surface of the lead frame 40 during assembly and wiper operation.

With the park switch bridge 54 rotatably mounted on the hub 56 of the cover 32 and the cover 32 fixably connected to the gear box housing 22, the radially outer ends of each beam 70 will successively lie in an intersecting arcuate path with the gear drive pin 36 carried on the drive gear 24.

During drive motor 12 operation, rotation of the drive gear 24 causes circumferential movement of the gear drive pin 36. During each revolution of the drive gear 24, the gear drive pin 36 will engage one of the arms 60 on the park switch bridge 54 as shown in FIG. 2. Regardless of the initial position of the arms 60 on the park switch bridge 54, at least one engagement of the gear drive pin 36 with one of the arms 60 will rotate the entire park switch bridge 54 sufficiently to bring the next circumferentially adjacent arm 60 to the position shown in FIG. 2 in which the contact 74 on the beam 70 of the arm 60 engages and forms an electrical closed circuit with the B+ conductive trace 42.

As the drive gear 24 and the gear drive pin 36 rotate, the gear drive pin 36 will engage the raised perimeter wall 68 on one arm 60 of the park switch bridge 54 rotating the park switch bridge 54 90° according to the positional relationship of the park switch bridge 54 and the gear drive pin 36 shown in FIG. 2. This brings the next arm 60 to the position shown in FIG. 2 wherein the contact 74 on the next arm 60 engages the first conductive trace 42.

It will be understood that the above described rotation of the park switch bridge 54 through a 90° arc occurs during each rotation of the drive gear 24 during drive motor 12 operation. The drive gear 24 and the park switch bridge 54 form a Geneva-type arrangement wherein 360° rotation of the drive gear 24 and the drive pin 36 results in 90° rotation of the park switch bridge 54.

During each 90° movement of the park switch bridge 54, starting from the position shown in FIG. 2, the park switch bridge 54 rotates in a direction bringing the arm 60 whose contact 74 was initially engaged the first conductive trace 42 on the lead frame 40, as shown in FIG. 2, across the park switch conductive trace 44 to the ground trace 46 as shown in FIG. 5. Through external logic or a controller, as is conventional, the transition of the contact 74 which initially engages the first conductive B+ trace 42 across the park switch or second conductive trace 44 to the third, ground conductive trace 46 is detected in conjunction with user switching of the wiper control switch from the "on" to the "off" position.

In this manner, the user can turn the wiper control switch to the "off" position at any point in the wiper cycle. The park switch bridge 54 will provide power to the wiper drive motor 12 until the gear drive pin 36 is rotated into engagement with one arm 60 on the park switch bridge 54 and rotates the engaged arm 60 90° transitioning the contact 74 initially contacting the first conductive trace 42 across the second park switch conductive trace 44 to the third ground conductive trace 46.

After contacting the third conductive or ground trace 46, the vehicle controller short circuits the drive motor armature to dynamically break the drive motor 12 to an immediate stop. In the stop position, the next circumferentially spaced arm 60 on the park switch bridge 54 will have rotated partially through a 90° arc such that the next circumferentially adjacent arm 60 on the park switch bridge 54 will not have reached the position shown in FIG. 2 and its contact 74 will not be in contact with the first conductive B+ trace 42.

After the next start of wiper operation, rotation of the drive gear 24 will cause the gear drive pin 36 to engage the arm 60 whose contact 74 is in engagement with the ground trace 46 and rotate the park switch bridge 54 until the next circumferentially lagging arm 60 on the park switch bridge 54 engages the first conductive trace 42 for a subsequent park switch operation.

It should be noted that since the gear drive pin 36 engages and rotates the park switch bridge 54 in only one direction of rotation of the drive gear 24 and the gear drive pin 36, the drive gear 24 and gear drive pin 36 are free to rotate in an opposite direction by almost 360° as a result of external forces exerted on the drive shaft 26 and drive gear 24 as would occur when the wiper arm, when moving to the park position, strikes an accumulation of snow or an other obstacle on the lower portion of the vehicle windshield. This eliminates any "chattering" of the wiper drive motor 12 as in previously devised wiper drive apparatus. As such, the park switch bridge 54 is not damaged by any reverse rotation of the drive gear 24 or moved to a position where it remains "stranded".

It should also be noted that the provision of multiple contacts 74 on the park switch bridge 54 distributes contact wear evenly over the circumferentially spaced contacts 74. In the present example where four contacts 74 are provided on the park switch bridge 54, wear on an individual contact 74 is reduced to ¼ of the wear that would be encountered with a conventional prior art park switch utilizing a single contact. This enables the park switch bridge 54 to be formed with an inexpensive contact 74 from the same material used to form the beam 70 without exceeding a critical beam thickness which would reduce the spring properties of the beam 70 or risking contact wear that is greater than the base material thickness of the beam 70.

Figure 6:
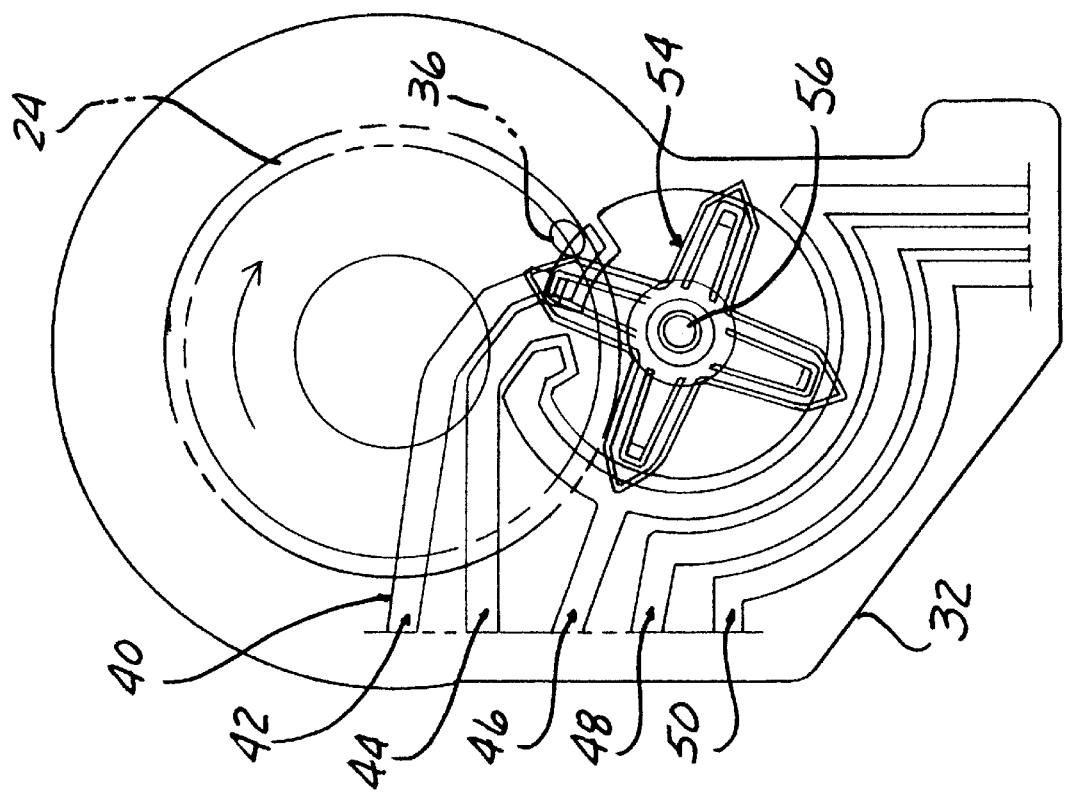
FIG. 6 is a bottom elevational view showing a mirror image construction of the cover, lead frame and park switch bridge according to the present invention.

Another advantageous aspect of the present invention is shown in FIG. 6. which depicts an opposite or left hand motor arrangement in which the cover 32, although having the same shape as the cover 32 shown in the right hand motor design depicted in FIGS. 1, 2 and 5, is nevertheless arranged for an opposite motor mounting position. However, the same park switch bridge 54 and the same lead frame 40 can be mounted on the cover 32 without requiring a second stamping tool for the lead frame 40 or a separate tool for a left hand park switch bridge 54. This reduces component proliferation and, more significantly, reduces the cost of the wiper drive apparatus.

What is claim is:

1. A wiper drive apparatus comprising:
   a drive motor;
   a drive gear driven by the drive motor and adapted to be connected to a wiper arm, the drive gear having a drive pin connected thereto;
   a housing enclosing the drive gear;
   a cover fixedly connectable on the housing enclosing the drive gear;
   a lead frame carried on the cover and including a plurality of discrete electrically conductive tracks; and
   a park switch bridge rotatably mounted on the cover and operably engageable intermittently with the drive pin of the drive gear for driven rotation in only one direction, the park switch bridge including a plurality of spaced contacts, each contact slidable over the conductive tracks to open and close a circuit to the drive motor.

2. The wiper drive apparatus of claim 1 wherein:
   the contacts extend radially from a center portion of the park switch bridge.

3. The wiper drive apparatus of claim 1 wherein the plurality of contacts includes four contacts.

4. The wiper drive apparatus of claim 1 wherein the contacts are equidistantly spaced apart.

5. The wiper drive apparatus of claim 1 wherein:
   each contact is resiliently carried on an arm; and
   each arm having one end at a center portion of the park switch bridge and an opposed outer end.

6. The wiper drive apparatus of claim 5 wherein one contact is carried on each arm.

7. The wiper drive apparatus of claim 6 further comprising a beam cantilevered from each arm, one contact mounted on each beam.

8. The wiper drive apparatus of claim 7 wherein the one contact is unitarily formed as part of the beam.

9. The wiper drive apparatus of claim 7 wherein the one contact is a pad fixably mounted on the beam.

10. The wiper drive apparatus of claim 7 wherein each beam projects from the plane of each arm.

11. The wiper drive apparatus of claim 5 further comprising:
    each arm having a planar portion; and
    a raised sidewall extending along at least a portion of a peripheral edge of the planar portion of each arm.

12. The wiper drive apparatus of claim 1 further comprising:
    an engagement member carried on the drive gear and rotatingly engagable with the park switch bridge for rotating the park switch bridge upon rotation of the drive gear.

13. The wiper drive apparatus of claim 1 wherein the park switch bridge further comprises:
    a disk rotatably mounted on the cover; and
    the plurality of contacts projecting radially from the disk.

14. The wiper drive apparatus of claim 13 wherein the plurality of contacts includes four circumferentially spaced contacts.

15. The wiper drive apparatus of claim 14 wherein the four contacts are equidistantly spaced 90° apart.

16. The wiper drive apparatus of claim 1 further comprising:
    a hub connected to the cover and extending internally with respect to the housing; and
    the park switch bridge mounted on the hub of the cover for rotation thereon.

17. A wiper drive apparatus comprising:
    a drive motor;
    a drive gear driven by the drive motor and adapted to be connected to a wiper arm;
    a cover mounted on a housing carrying the drive gear;
    a lead frame carried on the cover and including a plurality of discrete electrically conductive tracks;
    a park switch bridge rotatably mounted on the cover and engagably coupled to the drive gear, the park switch bridge including a plurality of spaced contacts, each contact slidable over the conductive tracks to open and close a circuit to the drive motor; and
    an engagement member carried on the drive gear and rotatingly engagable with the park switch bridge for rotating the park switch bridge in response to rotation of the drive gear, wherein the engagement member and the park switch bridge are arranged in intersecting rotatable paths of movement such that each revolution of the drive gear causes engagement of the engagement member with the park switch bridge to rotate the park switch bridge through an arc of substantially 90°.

18. The wiper drive apparatus of claim 17 wherein:
    the plurality of contacts includes four contacts, each contact formed on an arm extending radially from a center portion of the park switch bridge.

19. A wiper drive apparatus comprising:
    a drive motor;
    a drive gear rotated by the drive motor and disposed in a housing;
    a lead frame fixed within the housing and including a plurality of electrically conductive tracks;
    a park switch bridge rotatably mounted in the housing and including a plurality of spaced contacts, each contact slidable over the conductive tracks to open and close a circuit to the drive motor in response to rotation of the park switch bridge; and a park switch bridge drive member coupled to and rotatable with the drive gear, the park switch bridge and the park switch bridge drive member arranged in intersecting rotatable paths of movement such that each revolution of the drive gear causes the park switch bridge drive member to engage and rotate the park switch bridge through a predetermined arc, wherein the park switch drive member rotates the park switch bridge through an arc of substantially 90° for each revolution of the drive gear.

20. A wiper drive apparatus comprising:

a drive motor;

a drive gear rotated by the drive motor and disposed in a housing;

a plurality of electrically conductive tracks disposed in the housing; and a park switch bridge disposed in the housing and including a plurality of contacts, each contact slidable over the conductive tracks to open and close a circuit to the drive motor in response to rotation of the park switch bridge engaged intermittently with a drive pin the park switch bridge rotatable by the drive gear in one angular direction.

21. The wiper drive apparatus of claim 20 wherein 360° rotation of the drive gear will produce 90° of rotation of the park bridge switch.

22. The wiper drive apparatus of claim 20 further comprising:

the park bridge switch integrally formed as a stamping of electrically conductive material.

23. The wiper drive apparatus of claim 20 wherein the park switch bridge further comprises:

a central portion; and a plurality of arms extending radially from the central portion and at least one portion of each arm coplanar with respect to the central portion for supporting another nonplanar portion selectively engageable with one of the plurality of contacts as the park bridge switch is rotated.

24. The wiper drive apparatus of claim 23 wherein the central portion further comprises:

a centrally located frusto-conical hollow sleeve.

25. The wiper drive apparatus of claim 24 further comprising:

the nonplanar portion of the plurality of arms disposed at an angle relative to each other.

26. The wiper drive apparatus of claim 25 further comprising:

each nonplanar portion of the plurality of arms defined by a beam for supporting one of the plurality of spaced contacts and directing the contact to slidingly engage the plurality of electrically conductive tracks, each beam centrally located with respect to the planar portion of each arm and disposed at an angle with respect to the planar portion of each arm, the beam angled away from the planar portion of each arm and toward the hollow sleeve.

27. The wiper drive apparatus of claim 26 further comprising:

the planar portion of each arm and corresponding beam integrally formed with respect to one another while separated along at least three edges, and the beam bent angularly out of a plane of the arm to a predetermined angle with respect to the arm for engaging the conductive tracks disposed in the housing.

28. The wiper drive apparatus of claim 26 further comprising:

each beam integrally formed with an individual contact.

29. The wiper drive apparatus of claim 26 further comprising:

each beam formed of a resilient material to follow profile variations in the plurality of electrically conductive tracks.

30. The wiper drive apparatus of claim 23 further comprising:

the planar portion of each arm having first and second portions, the first portion disposed generally parallel with respect to the drive gear and the second portion disposed generally perpendicular with respect to the drive gear, the second portion engaged by the drive gear for rotating the park switch bridge.

31. The wiper drive apparatus of claim 20 further comprising:

a cover for enclosing the housing having a hub projecting internally with respect to the housing.

32. The wiper drive apparatus of claim 31 further comprising:

the plurality of electrically conductive tracks mounted on the cover.

33. The wiper drive apparatus of claim 31 further comprising:

the park switch bridge mounted on the hub.

34. The wiper drive apparatus of claim 20 further comprising:

an engagement member operably coupling the drive gear and the park switch bridge, the engagement member intermittently engageable with the drive gear for rotating the park bridge switch in one angular direction.

35. The wiper drive apparatus of claim 34 further comprising:

the park bridge switch having a central portion and a plurality of arms extending radially from the central portion, each arm having first and second portions, the first portion disposed generally parallel with respect to the drive gear and the second portion disposed generally perpendicular with respect to the drive gear, the second portion engageable by the engagement member for rotating the park switch bridge.

* * * * *